United States Patent [19]

Sanner

[11] 4,266,266
[45] May 5, 1981

[54] ELECTRICAL FIXTURE INTENDED PRIMARILY FOR OUTDOOR USE AND DESIGNED TO PROTECT AN ELECTRICAL DEVICE HOUSED THEREIN FROM THE ELEMENTS

[76] Inventor: George E. Sanner, Cypress Hill, Sparks, Md. 21152

[21] Appl. No.: 971,738

[22] Filed: Dec. 21, 1978

[51] Int. Cl.³ .............................................. H02B 1/04
[52] U.S. Cl. ................................. 361/357; 200/51 R; 174/38; 174/67
[58] Field of Search .............. 307/112, 150; 361/331, 361/332, 356, 357, 360, 363, 334; 174/38, 44, 45 R, 60, 81, 82, 135; 200/51 R, 302, 303; 339/116, 125, 154 R, 156, 157, 159, 164, 169, 170

[56] References Cited

U.S. PATENT DOCUMENTS

| 1,577,413 | 3/1926 | Volk, Jr. | 174/81 |
| 2,907,855 | 10/1959 | Hedges | 307/112 |
| 2,916,539 | 12/1959 | Hamilton | 174/38 |
| 3,188,379 | 6/1965 | Simon | 174/67 |
| 3,499,097 | 3/1970 | Widstrand | 174/135 |
| 3,521,220 | 7/1970 | Clarke, Jr. | 174/135 |
| 3,585,456 | 6/1971 | Phillips, Jr. | 174/38 |
| 3,663,864 | 5/1972 | Carlson | 307/150 |
| 3,895,179 | 7/1975 | Wyatt | 361/356 |
| 3,922,586 | 11/1975 | Buxton | 200/51 R |
| 3,936,589 | 2/1976 | Teeters, Sr. | 174/38 |

Primary Examiner—Gerald P. Tolin
Attorney, Agent, or Firm—LeBlanc, Nolan, Shur & Nies

[57] ABSTRACT

The electrical fixture provides a simple, fail-safe, electrical casing, and electrical service outlet, that may be used out-of-doors by consumers to power outdoor electrical appliances. It contains no doors, gaskets, springs, counter-weights or moveable parts to achieve weatherproof operation. Economic manufacture is achieved since fabrication of the fixture requires only a top cover, base and support stanchion, in addition to the electrical device. A toggle switch controls electrical outlet receptacle power and the casing may also be used as an outdoor hermetically sealed, junction box.

11 Claims, 5 Drawing Figures

U.S. Patent   May 5, 1981   4,266,266
FIG. 1
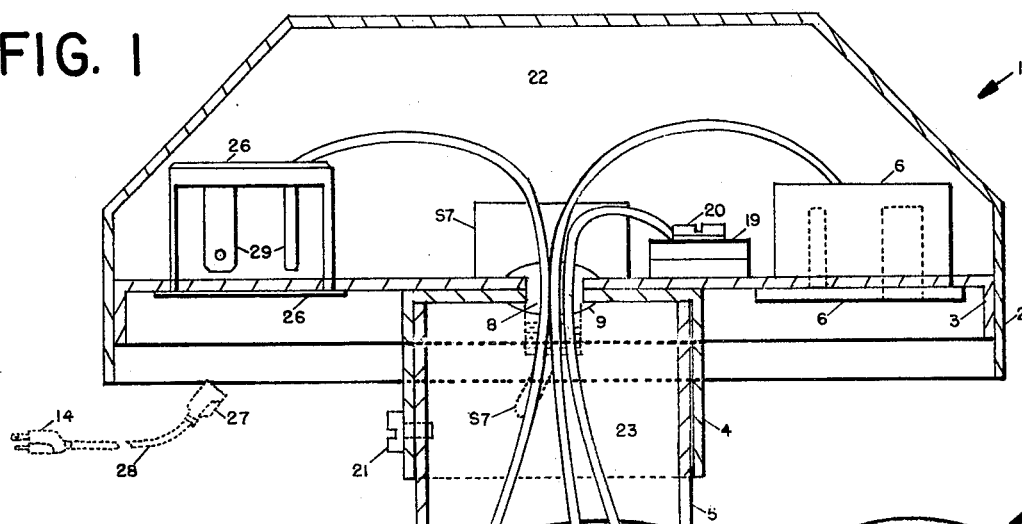
FIG. 2
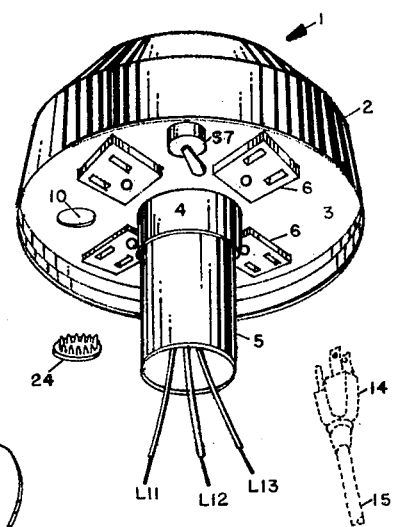
FIG. 3
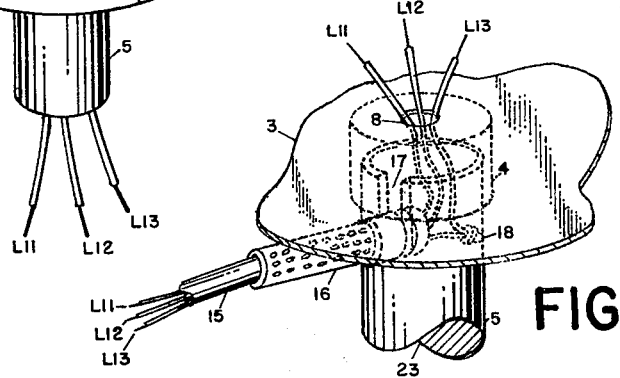
FIG. 4
FIG. 5
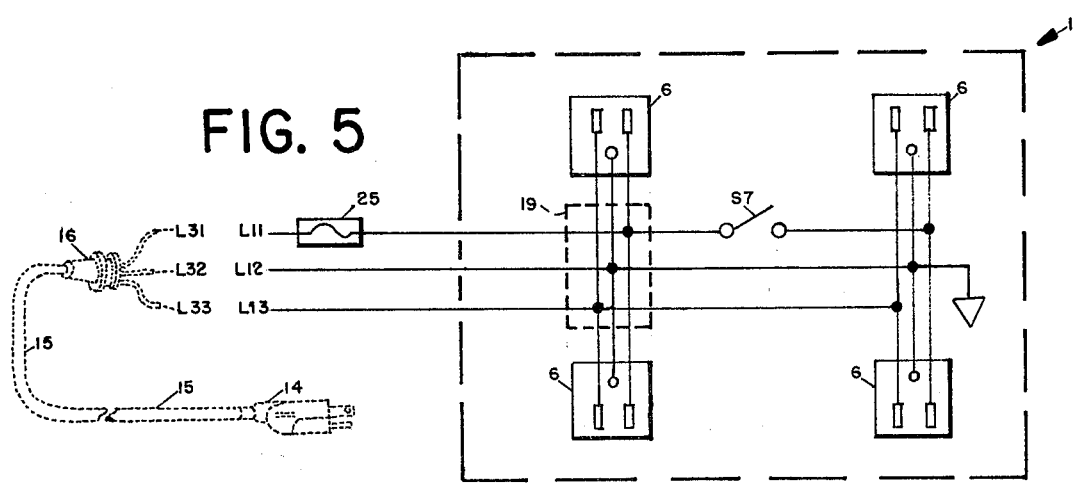

ELECTRICAL FIXTURE INTENDED PRIMARILY FOR OUTDOOR USE AND DESIGNED TO PROTECT AN ELECTRICAL DEVICE HOUSED THEREIN FROM THE ELEMENTS

BACKGROUND OF THE INVENTION

This invention relates generally to weatherproof types of electrical installation, and more particularly to weatherproof electrical service outlet receptacles, electrical junction boxes, and outdoor electrical service centers that are weatherproof, but utilize non-weatherproof electrical fittings.

Consumers and homeowners are spending more of their leisure time out of doors on patios, lawns, and pool decks. As this leisure time movement to the outdoors continues, consumers are requiring an increasing number of outdoor appliances, which include various types of electrical lights, electric grills, pool filters, lawn and hedge trimmers, lawn mowers, TV, and stereo systems. These appliances are often powered by electrical extension cords that are plugged indoors and extended to the appliances being operated outdoors.

Outdoor, wall type, electrical service outlet receptacles, when used, need to be both waterproof and weatherproof to be safe from electrical shock hazard. Since both personal safety and potential consumer product safety liability are involved, the development of do-it-yourself outdoor electrical service wiring systems, at voltage levels of 105–220 volts, has been moderately slow in growth. However, this problem has been recognized heretofore, and systems have been disclosed ranging from "Weatherproof Receptacle Covers and Shields" described in U.S. Pat. No. 4,102,466, to a "Weatherproof Electrical Installation With Pivotally Attached Hood Means" described in U.S. Pat. No. 3,188,379.

These devices all utilize conventional electrical outlet receptacles that are either hermetically sealed with physical covers, or have weather protective hoods covering the outlet receptacle(s). Outdoor wall receptacles with hermetically sealed screw covers, or with moveable doors, are most widely used. They are, however, least desirable, since they are not watertight when electric cords are plugged in place. More recent art, as disclosed in the above referenced patents, provides protective hoods that are generally raised when electric cords are attached, then returned to a closed protective position by gravity or springs. The disadvantages of these devices are as follows: the moving door must be physically opened for the receptacle to be used; with plugs in place, it is often difficult to get the door properly closed because tight right angle turns are required in the cords; doors requiring hinges, springs, counterweights and seals, are expensive to manufacture; and, such designs are not fail-safe. If the door does not close, for any reason, exposure can cause a dangerous electrical shock hazard.

A satisfactory outdoor receptacle must be fail-safe. Preferably, it should have no doors. It must be easy to use, and, plugging in cords must not interfere with its operation. It must comprise few parts, and be economic to manufacture. Finally, these remote electrical service outlets must be capable of both portable operation, and of permanent installation. Such receptacles must be capable of having their power turned on and off at the remote unit to achieve effective appliance control.

SUMMARY OF THE INVENTION

This invention provides a simple outdoor electrical service outlet that is weatherproof and requires no seals, protective hoods, or doors. It is portable, economic to produce, and safe for the consumer to use. It is also equally adaptable to permanent installation. These units provide outdoor electrical junction boxes, outlet receptacles, and appliance control centers, that are safe and easy for the consumer to use and operate. Only four parts are required for fabrication, in addition to electrical receptacles, and a control switch, if desired. A one piece casing cover is telescoped over a simple base. A cylindrical cap is attached to the base, and telescopes over a vertical tube which supports the fixture above the ground. Since the housing contains no openings, the unit is weatherproof and waterproof. No water can enter the system—even in severe storms. The interior of the casing may contain an electrical terminal board with electrical input and output cables entering the fixture within the tubular support stanchion in serpentine manner.

One, or more conventional electrical outlet receptacles may be snap-mounted in the base of the fixture and energized by a power cable entering the casing via the support stanchion. In this embodiment, the fixture is located out-of-doors, on the lawn or patio. Plug cords from outdoor electrical appliances (such as hedge trimmers, lawn mowers and the like) are simply plugged into these electrical outlet receptacles, and the fixture becomes an effective appliance control center. The base plate is recessed sufficiently into the casing cover to provide protection against weather, and still allow easy access for plugging in electrical cords. One to four electrical outlet receptacles may be easily installed in the base plate, which may also include a toggle switch for controlling power to one or more of the receptacles. Three-wire ground type receptacles are recommended for use with three-wire grounded appliance plugs to provide safety from electrical shock hazard. Ground-Fault-Circuit-Interrupter (G.F.C.I.) circuitry may also be used, in the fixture, to insure electrical safety.

These electrical fixtures are provided with a common center hole that extends through both the bottom plate and the cylindrical cap, through which the electrical hook-up leads are projected. Electrical connections are then simply accomplished within the tubular support stanchion, which also acts as a wiring box. The strain relief of a conventional extension cord may be snapped into an elongated notch located at the upper end of the tubular stanchion. The electrical cord may then simply be plugged into any available electrical outlet to provide electrical power to the invention in this embodiment. The electrical leads of the extension cord are connected to the wiring leads of the electrical fixture within the tubular stanchion. Alternatively, the strain relief of the electrical cord, may be anchored in a different hole in the base plate, and the above described center hole may be closed with a snap plug. The fixture may include a recessed male receptacle, into which the female plug of a conventional electrified extension cord can be inserted, as another means for energizing the fixture. Any conventional extension cord may be used.

In this embodiment the electrical fixture may be shipped by the manufacturer, as a fully portable outdoor electrical appliance service center. The do-it-yourself consumer may then install the fixture simply by plugging its cord into a convenient outlet and positioning the fixture on the lawn or patio, with no wiring required. Thus, a single manufacturing design provides a permanently wired-in model, a portable extension cord model, and a combination model, that manipulates a snap-plug between two holes, in the base plate of the fixture.

Although the embodiment described above, utilizes a frustoconical casing with a circular base, polyhedral, and other volumetric designs, with applicable base plates, may also be provided.

The invention provides a simple fail-safe electrical casing, and service outlet, that may be used out-of-doors by consumers to power outdoor electrical appliances. It has no doors, gaskets, springs, counterweights or moveable parts. Plugged-in cords will not interfere with its operation. It can be economically manufactured because few parts are required in its fabrication. It can be used for portable operation, or it can be permanently installed. Electrical power at the receptacles may be conveniently controlled by a simply operated toggle switch, located in the base plate. Finally, the described electrical fixture is weatherproof, although the electrical fittings utilized therein need not be weatherproof.

BRIEF DESCRIPTION OF THE DRAWING

The best mode presently contemplated for carrying out the invention, as well as other important objects, features, and additional advantages of the invention, will become apparent from the appended claims and as the ensuing detailed description and discussion proceeds in conjunction with the accompanying drawing, in which FIG. 1 is an elevation view of the electrical fixture showing typical embodiments;

FIG. 2 is a perspective view of the electrical fixture showing the single piece casing cover and a section of support stanchion;

FIG. 3 is a perspective view of the electrical fixture showing the casing cover, and base plate with electrical receptacles and toggle switch;

FIG. 4 is a partial perspective view showing extension cord wiring in the tubular stanchion; and FIG. 5 is a schematic wiring diagram showing a typical embodiment comprising four outlet receptacles, two of which are controlled by a toggle switch.

DESCRIPTION OF THE PREFERRED EMBODIMENT

The electrical fixture 1 shown in the drawing comprises four basic parts, in addition to the electrical receptacles, terminal boards, wires and possible required fasteners. These basic parts include housing, or casing cover 2, base plate 3, support cap 4, and vertical tubular stanchion 5. Referring to FIG. 1, housing cover 2 may be drawn, spun, stamped, or molded in a single piece with a closed top. A flat circular base 3 is stamped, or molded, in one piece to include a peripheral flange. Base 3 is then inserted, concavely, into the circular opening of casing cover 2 (see FIG. 3) making continuous contact with the interior peripheral surface of casing cover 2. Base plate 3 is recessed into casing cover 2 and may be attached to cover 2 by fasteners not shown. The cavity 22, formed between the concave surface of cover 2 and the convex surface of base 3, is weatherproof when the electrical fixture is oriented as shown in FIGS. 1-3. A cylindrical cap 4 is centrally attached to the exterior surface of base plate 3 as shown in FIGS. 1, 3, and 4. The cap may be attached by suitable fasteners, by spot welding. or it may be molded as an integral part of base 3. Cap 4 aligns and attaches fixture 1 to vertical support stanchion 5, which is a cylindrical tube in the embodiment envisioned. Tubular stanchion 5 supports fixture 1 above a supporting surface such as a patio deck or lawn. Cylindrical cap 4 is telescoped over cylindrical stanchion 5, as shown in FIG. 1 and attached thereto with fasteners 21. A central hole 8 is extended through base plate 3 and cap 4, and a rubber bushing 9 may be inserted therethrough. When fixture 1 is so constructed and installed, electrical conductors L11, L12, and L13 may be extended underground to tubular stanchion 5, through stanchion 5 in serpentine manner, through hole 8, and into the interior 22 of fixture 1. Electrical connections to L11, L12 and L13 may be made either in the interior 22 of fixture 1, or in the interior 23 of cap 4 and tubular stanchion 5.

In one embodiment of the invention, fixture 1 may be utilized as an outdoor weatherproof wiring junction box. Fixture 1 may be installed on the lawn as shown in FIG. 2, and may contain a wiring terminal strip, or block, 19 (see FIG. 1). Conductor L11 may be attached to conductor L12 through the electrical device or devices they serve by means of terminal connectors 20, for example. In this application, cover 2 is removed from fixture 1 when connections are being effected, and returned after connections have been completed. The base plate has no openings and a hermetic seal may be added between cover 2 and base plate 3 to achieve a hermetically sealed environment 22. Alternatively, cover 2 may remain attached to base plate 3, and a service opening may be added in base plate 3 for access to connectors 20. Typical applications include electrical service, telephone, and CATV home installations.

In a second embodiment, fixture 1 may provide an outdoor electrical switch that is installed on the lawn adjacent to the driveway for the purpose of controlling electrically operated garage doors. The fixture, as shown in FIG. 2 contains a toggle switch S7 (see FIGS. 1 and 3) which is located in base plate 3. Electrical control conductors from switch S7 are removed from interior 22 via hole 8 and interior 23 of stanchion 5.

In another embodiment, fixture 1 provides an outdoor weatherproof electrical outlet providing one, or more, flush-mounted electrical receptacles 6 installed in base plate 3, as shown in FIGS. 1 and 3. In this arrangement, fixture 1 is wired to an electrical power source, typically 105-130 volts, 60 Hz, A.C. Plugs 14, attached to electrical power cords 15 of outdoor electrical appliances, are plugged into electrified receptacles 6, as shown in FIG. 3. This provides a simple, safe, and affordable outdoor electrical service outlet that may be placed on the lawn, patio, or in a garden, by the do-it-yourself homeowner. Alternatively, it may be permanently installed during construction of new homes.

A typical outdoor weatherproof electrical appliance service center, of the type described above, is shown in FIGS. 3 and 5, and may include a toggle switch S7. The purpose of switch S7 is to control electrical power to one or more of the electrical receptacles 6. A typical embodiment shown in FIG. 5 includes four electrical outlet receptacles which may be of two or three-wire type. Toggle switch S7 controls electrical power to two of the four receptacles 6 immediately adjacent to the switch, while the two rear receptacles shown, would be powered continually. This arrangement provides the user with maximum versatility. Two-wire, or three-wire, receptacles may be used; and, FIG. 5 shows a typical three-wire system. A three-wire grounded system provides protection against potential electrical shock hazard. Additionally, fixture 1 may include Ground-Fault-Circuit-Interruption (G.F.C.I.) circuitry for providing additional electrical shock hazard protection. Finally, a fuse, or circuit breaker 25, may also be included to provide overload protection at the electrical service center, fixture 1.

The outdoor electrical receptacle, or service center, described above, may be simply manufactured from a single design to provide three different application configurations. In FIGS. 1, 3, and 4, base plate 3 is provided with hole 8 and hole 10. A spring-tooth type snap plug 24 is inserted into one of these two holes during manufacture, in accordance with the application configuration desired. In a first configuration, snap plug 24 is inserted into hole 10 (see FIG. 3) and conductor leads L11, L12, and L13 are extended through grommet 9 and hole 8 (see FIG. 1) to provide a fixture for permanent installation. When the system is permanently installed, an electric service cable is brought underground to vertical tubular support 5, through the interior of support 5 and electrical connections are made to conductors L11, L12, and L13 in the interior 23, at the upper end of stanchion 5, which serves as a wiring box.

In a second configuration, shown in FIG. 4, the strain relief 16, of a conventional electrical extension cord 15, is slipped into an elongated slot 17 located in the upper end of tubular stanchion 5; and, electrical connection to conductors L11, L12, and L13 is made in wiring box 23, as shown in FIGS. 4 and 5. Plug 14 of cord 15 is then plugged into any conventional, indoor or outdoor, electrical service outlet receptacle to energize fixture 1. In the configuration, snap plug 24 is inserted into hole 10, during manufacture, and fixture 1 may be used in either permanent installation, or for portable operation, as described. This is a hybrid, or combination, configuration.

In a third configuration, snap plug 24 (shown in FIG. 3) is inserted into hole 8 (shown in FIG. 1) and strain relief 16 of extension cord 15 (see FIG. 5) is inserted into hole 10 shown in FIG. 3, to provide a completely portable fixture 1. Extension cord electrical conductors L31, L32 and L33 are connected to fixture 1 conductors L11, L12, and L13, respectively, in the interior 22 of fixture 1 as shown in FIG. 5.

In the described manner, three different application configurations may be provided from a single manufacturing design, simply by interchanging snap plug 24 between holes 8 and 10. Furthermore, fixture 1 may be configured with snap plug 24 in hole 10 and conductors L11, L12, and L13 extending from hole 8. Thereafter, the consumer may easily, and safely, convert fixture 1 between portable and permanent installations, by using extension cord 15 and the configuration secondly described above, as shown in FIG. 4.

Another embodiment of fixture 1 may be shown by FIG. 1, in which snap plug 24 (see FIG. 3) is inserted in center hole 8 of FIG. 1 and a single recessed male receptacle 26 is utilized in base plate 3, to which is connected energizing conductors L11, L12, and L13. One or more electrical receptacles 6 are snap-mounted in base 3 to provide the desired electrical service outlets. The female end of connector 27 (see FIG. 1) of a conventional electrical extension cord 28, is then inserted into male receptacle 26. Fixture 1 is energized by means of electrical contact between plug 27 and pins 29, when extension cord 28 plug 14 is plugged into any conventional indoor, or outdoor, electrical receptacle. Since any conventional electrical extension cord can be used, fixture 1 may be easiy and safely installed by the do-it-yourself homeowner without the need of installation wiring. Any desired extension cord length may be selected for installation.

The embodiments, described herein, comprise a frustoconical casing with circular base. They could also utilize casings having quadric shapes, such as spherical, ellipsodial, and the like, with bases of appropriate shapes. Alternatively, polyhedral casings may be employed with corresponding polygonal bases.

What is claimed and desired to be secured by letters patent is:

1. The combination of an electrical fixture intended primarily for outdoor use and a hollow stanchion, said fixture comprising: a horizontally orientable base having a floor and a depending flange extending continuously around the periphery of said floor; a casing having a domed upper portion and a depending skirt extending continuously around the periphery of said upper portion, said casing being telescopically assembled to said base with said skirt tightly juxtaposed to said base flange continuously around the periphery thereof and extending downwardly beyond said base flange to thereby protect the cavity consequentially formed between said base and said casing from the elements; a downwardly opening, hollow, cylindrical mount on the lower side of said base floor supporting the base and casing assembly from, the upper end of said stanchion with the floor of said base above the stanchion said mount telescopically surrounding the upper end of the stanchion; an electrical device housed in the cavity between said base and casing and thereby protected from the elements as aforesaid; and means in said base floor providing electrical line access to said cavity and the electrical device housed therein.

2. The combination of claim 1 wherein said electrical device has connections which are externally accessible from the bottom side of the fixture base floor and protected from the elements by the skirt on said casing.

3. The combination of claim 2 which includes a switch housed in said cavity and electrically connected to said electrical device to control the application of voltage thereto, said switch having an actuator which is externally accessible from the bottom of the fixture base floor and protected from the elements by the skirt on said casing.

4. The combination of claim 1 wherein said electrical device is a male plug having pins which are externally accessible from the bottom side of the base floor, thereby making weather protected electrical service available to the fixture by a conventional extension type cord, said cavity also housing a female type receptacle having contacts available from the bottom of said floor and means electrically connecting said male plug to said female receptacle so that weather protected electrical service can likewise be made available to a load device by a conventional cord as aforesaid.

5. The combination of claim 1 which has an electrical switch in series between said male plug and said female receptacle, said switch having an actuator which is externally accessible from said bottom side of said floor and protected from the elements by the skirt on said casing along with said female receptacle contacts and said male plug pins.

6. The combination of claim 1 wherein said mount and said base are separate components and said mount has an upper portion which is adapted to be engaged by the upper end of said stanchion to thereby vertically locate said casing and base assembly relative thereto.

7. The combination of claim 6 wherein the means furnishing electrical line access to the cavity provided in the base-casing assembly comprises aligned apertures in the base floor and the upper, stanchion locating portion of said cylindrical mount, said apertures being aligned with the upper end of said stanchion and thereby being protected from the elements by said mount.

8. A combination as defined in claim 1 wherein said fixture has an apertured base with an electrical cable means which has conductors electrically connected to the electrical device in said cavity and extends upwardly through said base into said cavity and a strain relief means, said strain relief means being anchored to said base in the aperture therethrough to prevent forces on said cable from disrupting the connections between said conductors and said electrical device.

9. A combination as defined in claim 1 with an electrical cable means which has conductors electrically connected to the electrical device in said cavity and a strain relief means at one end thereof, there being a notch in said stanchion extending to a location subjacent the bottom of said cylindrical mount and said strain relief means being anchored to said stanchion in said notch to prevent forces on said cable from disrupting the connections between said conductors and said electrical device.

10. The combination of claim 1 wherein said electrical device is an electrical connector means for connecting together at least two conductors.

11. The combination of claim 1 wherein said electrical device is an electrical switch or circuit breaker.

* * * * *